June 19, 1945. E. E. HABIB ET AL 2,378,700
MANUFACTURE OF ARTICLES FROM LIQUID DISPERSIONS
Filed Nov. 16, 1943 vulcanization at 212°F.

EMILE E. HABIB
GORDON E. GOTT
Inventors
By Theodore C. Browne
Attorney

Patented June 19, 1945

2,378,700

UNITED STATES PATENT OFFICE 2,378,700

MANUFACTURE OF ARTICLES FROM LIQUID DISPERSIONS

Emile E. Habib and Gordon E. Gott, Arlington, Mass., assignors to Dewey and Almy Chemical Company, North Cambridge, Mass., a corporation of Massachusetts Application November 16, 1943, Serial No. 510,442

6 Claims. (Cl. 18—58)

This invention relates to the manufacture of hollow rubber objects having an opening which is smaller than the greatest diameter of the object and particularly to the manufacture of meteorological, radiosonde and life-saving balloons.

Balloons which are designed to carry recording instruments aloft are quite large. The common size is about 36 inches diameter before ascension and the envelopes must be capable of expanding to 12 feet or more to attain the necessary elevation before bursting. Dipping on molds as large as 36 inches in diameter is not a feasible commercial practice and building up balloons by cementing segments together is very expensive.

Such balloons have in the past been made by casting a natural latex dispersion containing a gelling agent in hollow molds which are rotated about two axes in a hot water bath, and then thinning the wall and simultaneously bringing the balloon to the proper large size and shape by inflating it. As applied to natural latex, this process is satisfactory although slow. However, when natural latex became unavailable and it was necessary to turn to synthetic materials, serious process difficulties were encountered. In the case of polymerized chloroprene-1,3, these difficulties were caused primarily by spontaneous syneresis during casting, resulting in lack of uniformity in the finished film, by the instability of the dispersion after a gelling agent had been added to it, and by the extreme sensitivity of the dispersion, which required an accuracy of control of time and temperature difficult to achieve in plant practice.

The war-time development of the inflatable life-saving raft created a need for a captive balloon to carry a radio antenna, which could be kept aloft for days at a time, even under the intense heat and light conditions encountered at sea in southern latitudes. Balloons made from natural rubber latex lose hydrogen by diffusion too rapidly and deteriorate too rapidly in sunlight to be useful for this purpose. It was found to be possible to make a polymerized chloroprene-1,3 balloon which is sufficiently age-resistant for the purpose, but again the same difficulties in factory-scale manufacture were encountered.

The present invention is based on the discovery that the deposit of polymerized halogen butadiene-1,3 gel formed on a balloon mold by dipping is sufficiently tear-resistant before drying to permit it to be removed from a balloon mold by stretching and yet is soft and plastic enough to permit sufficient plastic flow so that it may be permanently enlarged and thinned and rendered more nearly of spherical shape by inflating it. The inflation step is particularly important because it permits the production of spherical objects on forms which are flat in shape and of smaller size than the finished object. Flat forms, of course, occupy less space in the dipping bath, so that many can be dipped at one time.

It was further discovered that the same method can be applied to natural latex provided certain limitations as to the amount of combined sulphur in the rubber hydrocarbon at the time of dipping are observed. As the result of a lengthy study of the changes which take place in compounded latex in transit and storage, we have discovered that the amount of combined sulphur in the rubber has an important effect on the tear-resistance of the gel deposit and consequently on the possibility of stripping the gel from the form. Where a natural rubber dispersion is employed in which the combined sulphur is uniformly distributed among the rubber particles, it has been found that the deposited gel can be stretched at least 100%, provided the combined sulphur does not exceed a critical amount in the neighborhood of 0.45%. In referring to percentages of combined sulphur herein, we refer to the percentage of sulphur combined with the rubber hydrocarbon, based on the dry weight of the rubber hydrocarbon. It has also been found that when the dipping bath is composed of a mixture of rubber particles of differing combined sulphur content the mixture must contain a sufficient proportion of rubber particles having a combined sulphur content of less than 0.45% so that a coherent gel may be formed of sufficient strength to withstand stretching at least 100% to get it off the form. In general, we believe this condition is satisfied if the mixture contains enough low sulphur content rubber to form a continuous phase in the deposit.

It is customary in the dipped-goods industry for manufacturers to purchase their dipping compounds from suppliers who add sulphur, accelerators and pigments to the latex. Thereafter, some weeks pass between the time the original mix is made and the time that the compound is used by the goods manufacturer. When our process was tried with such commercial latex compounds, it failed. The gels were invariably too weak to be removed from the molds. On the other hand, it operated perfectly on compounds mixed in the laboratory and which were used without delay.

We believe that we are the first to discover that the very tender gels formed by coagulant dipping are tear-resistant enough to be removed from the mold by stretching, even though the diameter of the mold is considerably greater than that of the neck, and yet are plastic enough so that they can be permanently thinned and shaped by inflation.

In the accompanying drawing the several steps of our improved process as applied to the manufacture of balloons are illustrated, as far as possible, diagrammatically.

Figure 1 illustrates the coating of the mold with coagulant;

Figure 2 dipping of the coagulant-coated mold in the dispersion;

Figure 3 allowing the coagulant to diffuse uniformly through the deposit;

Figure 4 stripping the deposited gel from the mold;

Figure 5 inflating the object to thin it and give it its required size with uniform wall thickness;

In practicing the invention, the dipping mold is first coated with a layer of an appropriate coagulant by dipping it into a bath of the coagulant, the coagulant allowed to dry somewhat, and the mold dipped in the dispersion long enough to build up a deposit of the required thickness. The mold is then withdrawn from the dispersion and the coagulant allowed to diffuse throughout the deposit, thus coagulating the liquid film of uncoagulated dispersion which remains on the surface of the gel when the mold is withdrawn from the latex. When the deposit is uniformly coagulated, it will be found to be sufficiently tear-resistant to permit it to be stripped from the mold by stretching. After the object, for instance, a balloon, has been removed from the mold it is inflated to a predetermined extent while the gel is still sufficiently soft to permit plastic flow. It is then dried, which fixes its size, and later deflated and vulcanized. The plastic flow of the wall of the balloon during inflation permanently thins the wall so that the balloon assumes the desired larger size.

The invention will be further understood from the following examples which are given by way of illustration:

*Example 1.*—For a meteorological balloon made from a polymerized chloroprene-1,3 latex compound.

A dipping compound is made up in accordance with the following formula:

| | Parts by weight of solids |
|---|---|
| Polymerized chloroprene-1,3 dispersion (neoprene type 571) | 100 |
| Dibutyl sebacate emulsion | 15 |
| NH₃ (as ammonium hydroxide) | 0.28 |
| Hard clay (Suprex brand) | 7 |
| Dispersing agent (formaldehyde condensation product of naphthalene sulfonic acid) | 0.14 |
| Zinc oxide (Kadox) | 5.00 |
| Phenyl beta naphthylamine | 2.00 |
| Casein solution (10 per cent) | 0.35 |
| | 129.77 |

The dibutyl sebacate emulsion has the following formula:

| | Parts by weight |
|---|---|
| Dibutyl sebacate | 35.00 |
| Oleic acid | 1.10 |
| Wetting agent | 0.10 |
| Ammonium hydroxide (28%) | 1.10 |
| Water | 13.05 |
| | 50.35 |

The formula for the casein solution is as follows:

| | Parts by weight |
|---|---|
| Casein | 3.50 |
| Water | 337.50 |
| Ammonium hydroxide (28%) | 7.50 |
| | 348.50 |

The formula for the coagulant is as follows:

| | Parts by weight |
|---|---|
| Bentonite | 150 |
| Water | 900 |
| Acetone | 1321 |
| Calcium nitrate tetra hydrate | 1250 |
| Glycerine | 55 |
| | 3676 |

Figure 1:
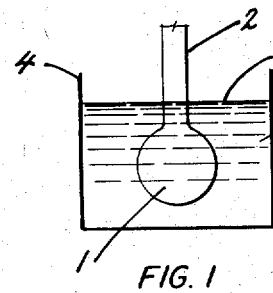
Figure 2:
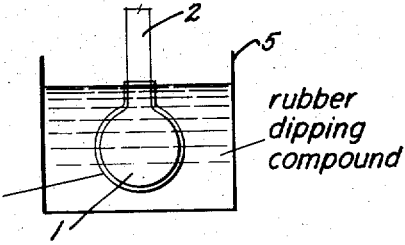
Figure 3:
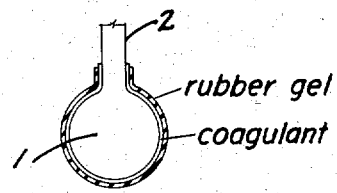
Figure 4:
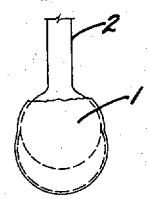
Figure 5:
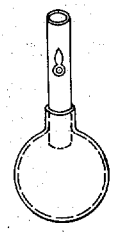
Figure 6:
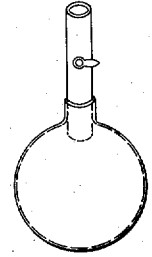
Figure 6 illustrates the drying step.
Figure 7:
Figure 7 illustrates the final step of vulcanizing the object.

*Procedure.*—A suitable flat mold 1, having a neck 2, is coated with coagulant by dipping the mold in a bath of coagulant 3 contained in the tank 4. After removal from the tank, the coagulant is allowed to dry somewhat and then the coated mold is dipped in the dispersion in the tank 5. The mold remains in the dispersion until the deposit thereon has attained the required thickness. The mold is then withdrawn from the latex and the coagulant is allowed to diffuse through the deposited gel, as indicated in Figure 3, thus coagulating the layer of uncoagulated dispersion which is on the surface of the gel at the moment when the mold is withdrawn from the bath. Next, the neck is stretched to the maximum diameter of the mold, which is about five times the size of the neck opening, and the balloon is pulled off or stripped from the mold as indicated in Figure 4. The presence of bentonite in the coagulant coating makes the stripping easier to perform. The gel is then inflated to the desired diameter as indicated in Figure 5, while the deposited gel is still plastic. This inflation reduces the thickness of the wall of the balloon while making it more nearly spherical in shape, and permanently increases its size. The balloon is then dried while still inflated, as indicated in Figure 6, and finally deflated and vulcanized by heating in dry air at a temperature of about 212° F., as indicated in Figure 7.

In the foregoing description, the process described is that which is employed in making balloons on forms the greatest diameter of which is 4 or 5 times that of the neck. The procedure is equally applicable to balloons having a relatively smaller maximum diameter and which consequently need not be stretched so severely.

*Example 2.*—For a life-saving (captive) balloon to contain hydrogen:

| | Parts by weight of solids |
|---|---|
| Polymerized chloroprene-1,3 dispersion (neoprene type 571) | 100 |
| Ammonia (as ammonium hydroxide) | 0.28 |
| Hard clay (Suprex brand) | 7.00 |
| Dispersing agent (formaldehyde condensation product of naphthalene sulfonic acid) | 0.14 |
| Zinc oxide (Kadox) | 5.00 |
| Phenyl beta naphthylamine | 2.00 |
| Casein solution [1] (10%) | 0.35 |
| | 114.77 |

[1] The casein solution and coagulant have the composition described in Example 1.

*Procedure.*—The same as in Example 1, except that the vulcanization step is omitted.

*Example 3.*—For a balloon made from natural rubber latex.

The dipping compound has the following composition:

| | Parts by weight of solids |
|---|---|
| Rubber latex (60% solids) | 100. |
| Potassium hydroxide [2] | 1.75 |
| Zinc stearate | 1.00 |
| Zinc dibutyl dithiocarbamate | 1.00 |
| Symmetrical di-beta-naphthyl para phenylene diamine | 1.00 |
| Formaldehyde condensation product of naphthalene sulfonic acid | 0.24 |
| Titanium dioxide | 1.00 |
| Sulphur | 1.10 |
| | 107.09 |

[2] The amount will vary with different latices. Sufficient should be used to give the dispersion a viscosity suitable for dipping.

The coagulant has the following composition:

| | |
|---|---|
| Bentonite | 150 |
| Water | 900 |
| Acetone | 1,321 |
| Calcium nitrate tetra hydrate | 1,250 |
| Glycerine | 55 |
| Glacial acetic acid | 37 |
| | 3,713 |

The ingredients are added in the order stated.

*Procedure.*—The dipping procedure is the same as in Example 1.

The sulphur in this dispersion will slowly combine with the latex particles. When freshly prepared the compound contains substantially no combined sulphur, but the amount will be found to increase slowly until the bath finally becomes unusable, because gels deposited from it could not be stripped from the mold. The bath must be used, if it is to be used for making balloons in which the neck must be stretched as much as 100% to strip them from the molds, before the amount of combined sulphur reaches as much as 0.45%. Analysis of the above composition showed the amount of combined sulphur at the end of one day to be 0.18%. The compound was used at this time according to the procedure of Example 1. In stripping test objects from the mold, it was found that the objects could be stripped without tearing from forms having a greatest diameter five times the diameter of the neck. However, when the bath had aged for one day more, the combined sulphur was found to be 0.24%, and objects formed from the dispersion could not be stripped from 5 to 1 ratio forms but could be stripped from a 4 to 1 form. At the end of three days, the combined sulphur had increased to 0.38% and the specimens could be stripped from a form having a neck-greatest diameter ratio of 1 to 3 but not from one of 1 to 4 ratio. At the end of five days, the per cent of combined sulphur was 0.45% and the specimen could not be stripped from a mold having a stretching ratio of 1 to 3, but could just be stripped from a mold in which the ratio was only 1 to 2. At the end of the sixth day the combined sulphur was 0.47 and the specimen could not be stripped from a mold having a ratio of neck opening to greatest diameter of 1 to 2.

These figures indicate how the tear-resistance of the deposited gel decreases as the compound ages and the free sulphur combines with the rubber hydrocarbon until the rubber particles have lost their cohesion to such an extent that the gel is too weak to be stretched to any useful extent. Therefore, we conclude that in a uniform mixture the deposit ceases to have the necessary tear resistance to permit stripping when the combined sulphur exceeds a critical point which appears to be about 0.45% and that the bath will be usable until the combined sulphur exceeds 0.45%.

While the herein-described process is particularly applicable to polymerized halogen butadiene-1,3 and natural rubber, we believe it to be applicable to other elastomers capable of being made into liquid dispersions from which tear-resistant, coherent gels can be coagulated. Accordingly, in the foregoing specification and claims, we have used the word "rubber" in an inclusive sense.

While it is convenient to think of a dipping mold for a balloon as spherical in shape with a neck, it is customary in plant practice to use flat or fluted molds. Accordingly, we have used the phrase "greatest diameter" to designate the greatest dimension of the mold which must pass through the neck opening.

When the stripped gel is to be enlarged from a small to a large area, removal of the deposit from the mold while the net form of the gel is conserved by keeping the interstices of the net filled or distended with an "intervenor," as it is called by Beckmann, U. S. Patent No. 1,745,657, is necessary. It is not essential that all of the water which originally formed the continuous phase of the dispersion should be conserved, but it is essential that a large proportion—at least enough to allow plastic movement of the rubber aggregates in the areas which are to be expanded—be conserved to permit uniform expansion of the gel. Herein, we refer to a gel in this condition as a "plastic gel."

While excellent balloons may be made by the casting process from natural rubber, and probably satisfactorily from polymerized chloroprene-1,3, casting is essentially a slow process since the objects are cast individually and the process does not lend itself readily to mass production. Our improved process, on the other hand, is particularly adapted to mass production since the molds may be handled in gangs, as many as six hundred or more balloon molds being dipped at one time, and the stripping can be done with great rapidity. This great improvement in manufacture is made possible by our discovery that a gel produced by dipping is sufficiently tear-resistant to permit it to be stripped from the mold and yet is plastic enough to allow it to be subsequently enlarged and thinned by inflation.

We claim:

1. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of rubber to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property.

2. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of rubber to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property, and inflating the object while the deposited gel is still capable of plastic flow.

3. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of rubber to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property, inflating the object while the deposited gel is still capable of plastic flow, and drying the inflated object and vulcanizing.

4. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of polymerized chloroprene 1,3 to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property.

5. The process of making a hollow inflatable object having an opening which is less than one-half the greatest diameter of the object which includes preparing a liquid dispersion of natural rubber containing sufficient rubber with combined sulphur less than 0.45 per cent to form a coherent gel which is capable of being stretched at least 100 per cent without breaking, dipping a mold coated with coagulant and having a body of large diameter and a portion shaped to form an opening less than one half the large diameter into said liquid dispersion of natural rubber to form a deposit on the mold, withdrawing the mold from the dispersion, stripping the deposited gel from the mold by stretching it while the deposit has enough water to allow plastic flow in the areas which are to be expanded and prior to the deposit in the said areas which are to be expanded attaining any substantial elastic property.

6. The process of making a hollow inflatable object having an opening which is less than one-half the greatest diameter of the object, which includes preparing a liquid dispersion of natural rubber containing sulphur, dipping a mold coated with coagulant and having a body of large diameter and a portion shaped to form an opening less than one-half the large diameter into said liquid dispersion of natural rubber while the combined sulphur is less than 0.45 per cent to form a deposit on the mold, withdrawing the mold from the dispersion, stripping the deposited gel from the mold by stretching it while the deposit in the said areas which are to be expanded has enough water to allow plastic flow in the areas which are to be expanded and prior to the deposit attaining any substantial elastic property and inflating the object while the deposited gel is still capable of plastic flow.

EMILE E. HABIB.
GORDON E. GOTT.

---

CERTIFICATE OF CORRECTION.

Patent No. 2,378,700. June 19, 1945.

EMILE E. HABIB, ET AL.

It is hereby certified that error appears in the printed specification of the above numbered patent requiring correction as follows: Page 4, second column, line 37, beginning with the words "in the" strike out all to and including the syllable "posit" in line 40, and insert instead the following -

--has enough water to allow plastic flow in the areas which are to be expanded and prior to the deposit in the said areas which are to be expanded--;

and that the said Letters Patent should be read with this correction therein that the same may conform to the record of the case in the Patent Office.

Signed and sealed this 2nd day of October, A. D. 1945.

Leslie Frazer (Seal) First Assistant Commissioner of Patents.

half the greatest diameter of the object which includes dipping a mold coated with coagulant and having a body of large diameter and a portion shaped to form an opening less than one-half the large diameter into a liquid dispersion of rubber to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property, and inflating the object while the deposited gel is still capable of plastic flow.

3. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of rubber to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property, inflating the object while the deposited gel is still capable of plastic flow, and drying the inflated object and vulcanizing.

4. The process of making a hollow inflatable object having an opening which is less than one-half the greatest diameter of the object which includes dipping a mold coated with coagulant and having a body of large diameter and a portion shaped to form an opening less than one-half the large diameter into a liquid dispersion of polymerized chloroprene 1,3 to form a deposit on the mold, withdrawing the mold from the dispersion and stripping the deposited gel from the mold by stretching it while the deposit has enough water to allow plastic flow in the areas which are to be expanded and prior to the deposit in the said areas which are to be expanded attaining any substantial elastic property.

5. The process of making a hollow inflatable object having an opening which is less than one-half the greatest diameter of the object which includes preparing a liquid dispersion of natural rubber containing sufficient rubber with combined sulphur less than 0.45 per cent to form a coherent gel which is capable of being stretched at least 100 per cent without breaking, dipping a mold coated with coagulant and having a body of large diameter and a portion shaped to form an opening less than one half the large diameter into said liquid dispersion of natural rubber to form a deposit on the mold, withdrawing the mold from the dispersion, stripping the deposited gel from the mold by stretching it while the deposit has enough water to allow plastic flow in the areas which are to be expanded and prior to the deposit in the said areas which are to be expanded attaining any substantial elastic property.

6. The process of making a hollow inflatable object having an opening which is less than one-half the greatest diameter of the object, which includes preparing a liquid dispersion of natural rubber containing sulphur, dipping a mold coated with coagulant and having a body of large diameter and a portion shaped to form an opening less than one-half the large diameter into said liquid dispersion of natural rubber while the combined sulphur is less than 0.45 per cent to form a deposit on the mold, withdrawing the mold from the dispersion, stripping the deposited gel from the mold by stretching it while the deposit in the said areas which are to be expanded has enough water to allow plastic flow in the areas which are to be expanded and prior to the deposit attaining any substantial elastic property and inflating the object while the deposited gel is still capable of plastic flow.

EMILE E. HABIB.
GORDON E. GOTT.

---

CERTIFICATE OF CORRECTION.

Patent No. 2,378,700.   June 19, 1945.

EMILE E. HABIB, ET AL.

It is hereby certified that error appears in the printed specification of the above numbered patent requiring correction as follows: Page 4, second column, line 37, beginning with the words "in the" strike out all to and including the syllable "posit" in line 40, and insert instead the following -

--has enough water to allow plastic flow in the areas which are to be expanded and prior to the deposit in the said areas which are to be expanded--;

and that the said Letters Patent should be read with this correction therein that the same may conform to the record of the case in the Patent Office.

Signed and sealed this 2nd day of October, A. D. 1945.

Leslie Frazer (Seal)       First Assistant Commissioner of Patents.